Figure 1:
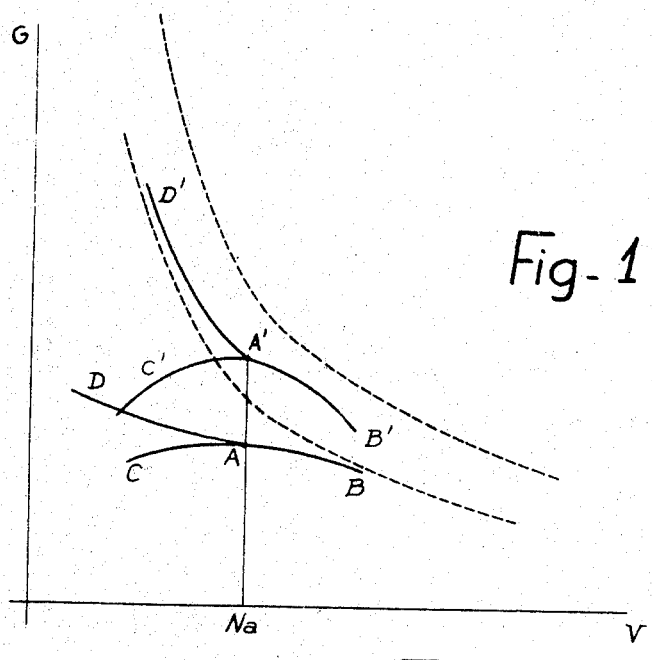

Inventor
Gäetan De Coye De Castelet

Attorneys 3,349,759
DIFFERENTIAL SUPERCHARGING OF ENGINES
Gaëtan de Coye de Castelet, Billancourt, France, assignor to Regie Nationale des Usines Renault, Billancourt, France
Filed Oct. 7, 1965, Ser. No. 493,636
Claims priority, application France, Dec. 24, 1964, 2, Patent 1,427,207
3 Claims. (Cl. 123—119)

A method of supercharging internal combustion engines is known which consists in driving the supercharging compressor by taking the necessary power from the engine shaft by way of a differential mechanism which connects together the engine shaft, the compressor shaft and the shaft leading to the working part or parts.

The arrangement most often recommended for this mechanism is that of a simple epicyclic gear whose planet wheel carrier is connected to the engine shaft, the internally toothed annulus to the working parts and the central pinion, by way of a transmission of appropriate ratio, to the supercharging compressor. It is described for example in the French Patent No. 939,526 of January 6, 1947, in the name of Mr. Flory Baron.

The effect of such an arrangement is that the supercharging compressor is driven by the engine not, in the usual way, with a constant speed ratio, but with a torque representing a constant fraction of the torque supplied by the engine. As a result, if the compressor is of the volumetric type, the supercharging pressure which it supplies is also substantially proportional to the engine torque.

The torque $C_1$ supplied at each engine speed by an engine supercharged in this way is, with a rough approximation, greater than the torque $C_0$ of the same engine operating with natural aspiration in a ratio of the following form $$\frac{C_1}{C_0} = \frac{1}{1 - KC_0}$$

where the constant K depends on the ratio of the differential gear and the proportionality ratio between the torque transmitted to the compressor and the supercharging pressure. This ratio decreases rapidly when $C_0$ decreases.

The torque supplied by an engine driving its compressor conventionally with a constant speed multiplication is on the contrary increased at all regimes only in a fixed ratio $C_1/C_0$ which is, with rough approximation, that of the respective output rates of the compressor and the engine.

For one and the same engine, characterized by its torque curve in dependence on the regime obtaining with natural aspiration, the torque curve obtained by differential supercharging will exhibit more considerable slopes than the curve obtained by driving the compressor with constant-speed multiplication.

This result constitutes an advantage for the differential supercharging in the zone of higher regimes than the maximum-torque regime, where the descending course of the torque curve with natural aspiration results, as has just been explained and as will be shown hereinafter, in a still more accentuated slope of the torque curve with supercharging, since the latter then approaches, in this zone, the equal-power hyperbola which corresponds to the ideal use of an engine which is to supply power to a variable-regime output shaft.

For the same reason, in the zone of regimes lower than the maximum-torque regime, the torque curve of the engine with differential supercharging also has a more accentuated slope, which constitutes a disadvantage of differential supercharging, since the torque supplied decreases very rapidly in proportion as the regime decreases, whereas it would be desirable not only that the said torque should decrease as little as possible but that it should even continue to increase.

The object of the present invention is to combine with the known differential driving of the supercharging compressor a likewise known apparatus constituted by a hydrokinetic torque converter with disengageable reaction member, in such a manner that the characterisic of the latter of being able to supply at its output shaft a torque decreasing in a constant manner with an increasing regime, makes it possible to obtain at the output shaft of the differential mechanism a torque of the same rate, as near as possible to an equal-power hyperbola.

The invention consists in arranging between the engine output shaft and the input shaft of the differential mechanism a torque converter having a disengageable reaction member, which may or may not be supplemented by the addition, also known per se, of a clutch which renders the impeller and the turbine fast with one another in the phase wherein the converter operates as a fluid coupling.

Figure 2:
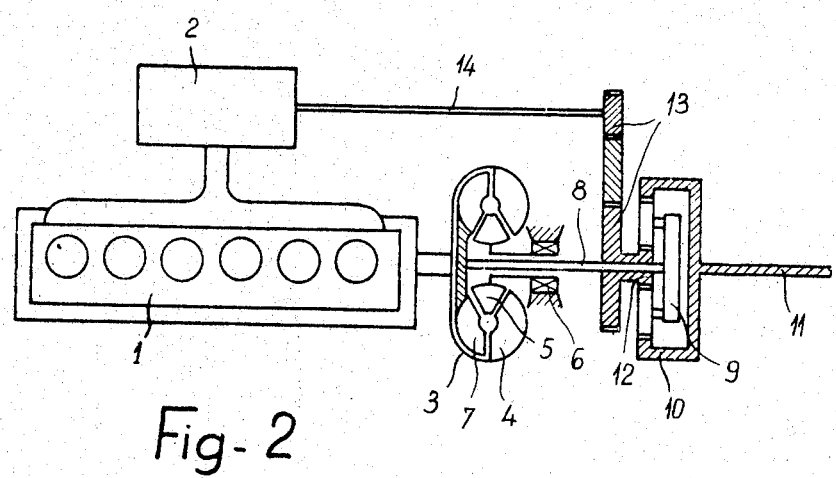

The invention will be explained with the aid of FIGURES 1 and 2 herewith, these figures showing respectively the following:

FIGURE 1 the pattern of the torque curve of an internal combustion engine with natural aspiration, with conventional differential supercharging and with differential supercharging according to the invention;

FIGURE 2 shows the arrangement of the parts: engine, torque converter, differential mechanism for distributing drive, and supercharging compressor for obtaining the result illustrated in FIGURE 1.

In FIGURE 1, torque values are plotted as ordinates and corresponding shaft rotation speeds as abscissae.

The curve CAB is that of the engine torque with natural aspiration, measured at its output shaft as a function of the speed of the said shaft. It exhibits at A a maximum value at the regime $N_a$.

The curve C'A'B' is that of the engine torque with conventional differential supercharging, measured at its output shaft which is at the same time the input shaft of the drive-distributing differential mechanism, as a function of the speed of this shaft. At the same regime $N_a$, this curve exhibits at A' a maximum value on either side of which it drops considerably. The branch A'B' follows approximately the orientation of the equal-power hyperbolas (two of which have been shown in broken lines by way of comparison) showing that the engine supplies a power which varies only slightly with the particular regime. On the contrary, the branch A'C', which also drops considerably, moves rapidly away from the equal-power hyperbola, showing that the power available decreases considerably with the decrease in the regime.

The curve D'A'B' representing the torque measured at the input shaft of the differential mechanism as a function of the speed of this shaft on the assumption that, in accordance with the present invention, a torque converter is interposed between the engine shaft and the said input shaft, is substantially identical at its branch A'B' with the preceding curve, the converter being here in the coupling (and possibly positive clutch-engagement) phase. On the other hand, its branch A'D' is a rising branch and determined so as to be relatively near to an equal-power hydrebola.

This result is obtained by a suitable choise of the form of the branch AD, representing the torque, measured at the output shaft of the converter and as a function of the rotational speed of the said shaft, which the engine provided with the converter but operating with natural aspiration would supply. The form of the branch AD results from the choice of the characteristics of form and dimensions of the hydraulic circuit of the converter, a choice which is within the field of the state of the art as far as hydraulic torque converters are concerned, and does not form part of the present invention.

It should be remarked:

(a) That the point AA' of maximum torque has been selected, with a view to simplification in the preceding description, as the coupling point between the converter phase and the coupling phase, but that without departing from the framework of the invention the coupling point may be selected at a regime greater than or less than $N_a$ in dependence on the desired torque curve form;

(b) That the form of the branch A'D', more particularly the values of the torque supplied at the lowest regimes of the input shaft of the differential mechanism and consequently the values of the corresponding supercharging pressure of the engine are to be chosen in accordance with the mechanical and thermal possibilities of the said engine under the particular working conditions in question;

(c) That the aforesaid condition, bearing in mind the increase in torque obtained by the differential supercharging system, will result in adopting for the converter a torque multiplication characteristic which rises less (going from the coupling point towards the low regimes) than is usual for converters used in known manner between the output of the differential mechanism and the working parts, for example the driving wheels in the case of a vehicle;

(d) That moreover the torque converter used in the invention will never function under the maximum torque multiplication conditions with the output shaft stationary, as is the case on starting from a stopped condition with conventional torque converters arranged between the output of the engine unit and the working parts. On starting from a standstill in the case of a mechanism according to the invention the output shaft of the drive-distributing differential is arrested, but the input shaft of this differential which is at the same time the output shaft of the converter, continues to rotate and drive the supercharging compressor;

(e) That depending on the uses envisaged for the engine assembly constructed as has just been described, it may be necessary to interpose between the output shaft of the differential and the working parts elements such as a clutch, reversing device, automatic or non-automatic gear box, which do not come with the frame-work of the invention.

FIGURE 2 shows at 1 the engine and at 2 the supercharging compressor. Situated at the output side of the engine is the torque converter 3 which is represented here in the form of a conventional hydrokinetic device composed of the impeller 4, the reaction member 5 mounted on a freewheel device 6 carried by a fixed element of the frame and a turbine 7 connected to the output shaft 8. The latter is fast with the planet wheel carrier 9 of the differential gear whose annulus 10 is fast with the output shaft 11 and whose central pinion 12, by way of the gearing 13, drives the shaft 14 of the compressor 2.

The shaft 8 is the shaft on which the torque represented by the curve D'A'B' in FIGURE 1 acts. Owing to the effect of the differential mechanism, a constant percentage of this torque is transmitted to the shaft 14 and consequently to the compressor 2 and a constant percentage, representing apart from output the remainder from 100 of the first-mentioned percentage, is transmitted to the shaft 11 which transmits drive to the working parts.

I claim:

1. In an internal combustion engine provided with a volumetric compressor to supercharge said engine, the improvement comprising a torque converter having an impeller connected to the output shaft of the engine, a disengageable reaction member, and a turbine member, and a differential gear having a planet wheel carrier mounted on the output shaft of said turbine member of the torque converter, an annulus fixed to the output shaft of the gear, and a central pinion driving the compressor shaft by way of a gear train.

2. The apparatus according to claim 1, wherein the reaction member is mounted on the vehicle frame through the agency of a freewheel device.

3. A method for supercharging an internal combustion engine comprising the steps of distributing the torque received from the engine in a constant proportion between the supercharging compressor and the engine load by a differential mechanism, and supplying to the input of the differential mechanism a torque under full load which decreases in a constant manner with increase in speed.

References Cited

UNITED STATES PATENTS 3,077,730   2/1963   Glamann _____ 60—12

MARK M. NEWMAN, *Primary Examiner.*

D. HART, *Assistant Examiner.*